Nov. 30, 1954  C. W. SPOHR  2,695,569
APPARATUS FOR MAKING LOOPED-CORD LOLLIPOPS
Filed July 28, 1950  10 Sheets-Sheet 3

Fig. 3

INVENTOR.
Carl W. Spohr,
BY
Louis Robertson
Atty.

Nov. 30, 1954     C. W. SPOHR     2,695,569
APPARATUS FOR MAKING LOOPED-CORD LOLLIPOPS
Filed July 28, 1950     10 Sheets-Sheet 7

INVENTOR.
Carl W. Spohr,
BY
Louis Robertson
Atty.

United States Patent Office 2,695,569
Patented Nov. 30, 1954

2,695,569
APPARATUS FOR MAKING LOOPED-CORD LOLLIPOPS

Carl W. Spohr, Chicago, Ill., assignor to The Curtiss Candy Company, Chicago, Ill., a corporation of Illinois Application July 28, 1950, Serial No. 176,340

18 Claims. (Cl. 107—8)

In recent years, lollipops in which the handle is comprised of a looped cord have been very popular. Inasmuch as lollipops are enjoyed by small children, the wooden stick handles formerly used represented a real hazard. For example, if a child should fall with a lollipop in his mouth, the stick might easily pierce his mouth or throat. Even handles of more flexible material, such as impregnated paper cord, have enough rigidity to put out an eye, if the child's fall results in an endwise thrust through a straight handle. With a looped cord, an endwise thrust is impossible. Furthermore, because the candy is supported by both ends of the looped cord, the cord can be more flexible than if only one end were used.

Machines for making looped-cord lollipops have been perfected heretofore. One example is illustrated in my prior patent, No. 2,278,574 dated April 7, 1942. The present invention relates to a very different type of machine for producing such lollipops. In some respects, the machine is much simpler than machines which have been successful heretofore. For example, a looper is provided which cooperates with the forming dies so that many parts are eliminated as compared to prior loopers. In addition, the forming dies are carried by a drum instead of a chain, thus permitting various simplifications.

The apparatus is capable of making smaller lollipops with uniform high quality production than previous machines. This is largely the result of feeding the candy to the forming dies in two separate pieces, one on each side of the handle instead of in one piece folded to receive the handle. The ability to make smaller lollipops is important in these days of increased costs when the selling of a lollipop for one cent becomes a major accomplishment, regardless of the size of the lollipops.

Another item in reducing the cost of the lollipops is to reduce the length of the cord. The present invention is able to produce a looped-handle lollipop with a shorter length of cord than previous apparatus.

Additional objects and advantages of the invention will be apparent from the following description and the drawings.

Designation of figures

Figure 13 is a vertical sectional view taken approximately on the line 13—13 of Figure 5 and corresponding also to the line 13—13 of Figure 6, and Figures 14-L and 14-R represent the right- and left-hand views of the double cam tracks for actuating the die plungers, the movement of the plungers being from the right-hand side of Figure 14-R which corresponds to the cord-looping position through to the left-hand side of Figure 14-L, the full lines representing a complete cycle.

General description

Although the law requires a full and exact description of at least one form of the invention, such as that which follows, it is, of course, the purpose of a patent to cover each new inventive concept therein, no matter how it may later be disguised by variations in form or additions of further improvements; and the appended claims are intended to accomplish this purpose by particularly pointing out the parts, improvements or combinations in which the inventive concepts are found.

Figure 1:
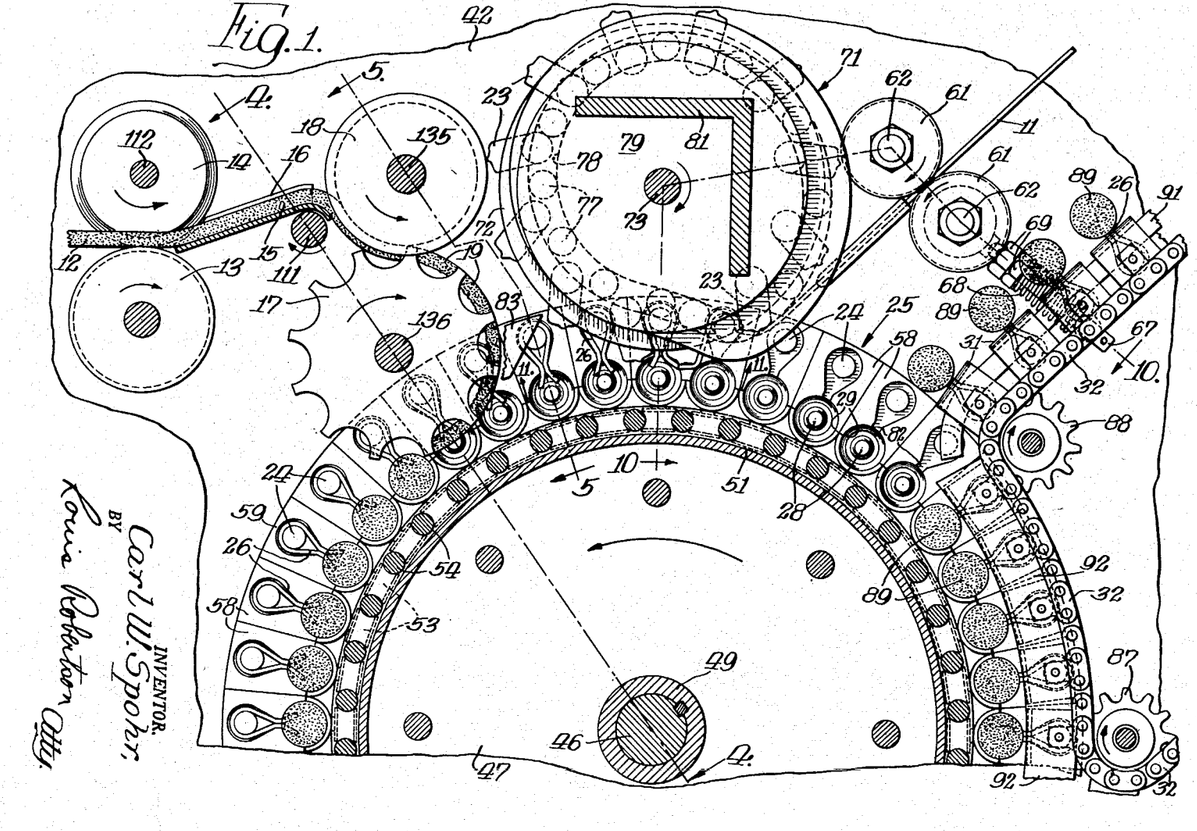
Figure 1 is a fragmentary longitudinal vertical section view of the main portions of the apparatus chosen for illustration of this invention, taken on line 1—1 of Fig. 2.
Figure 2:
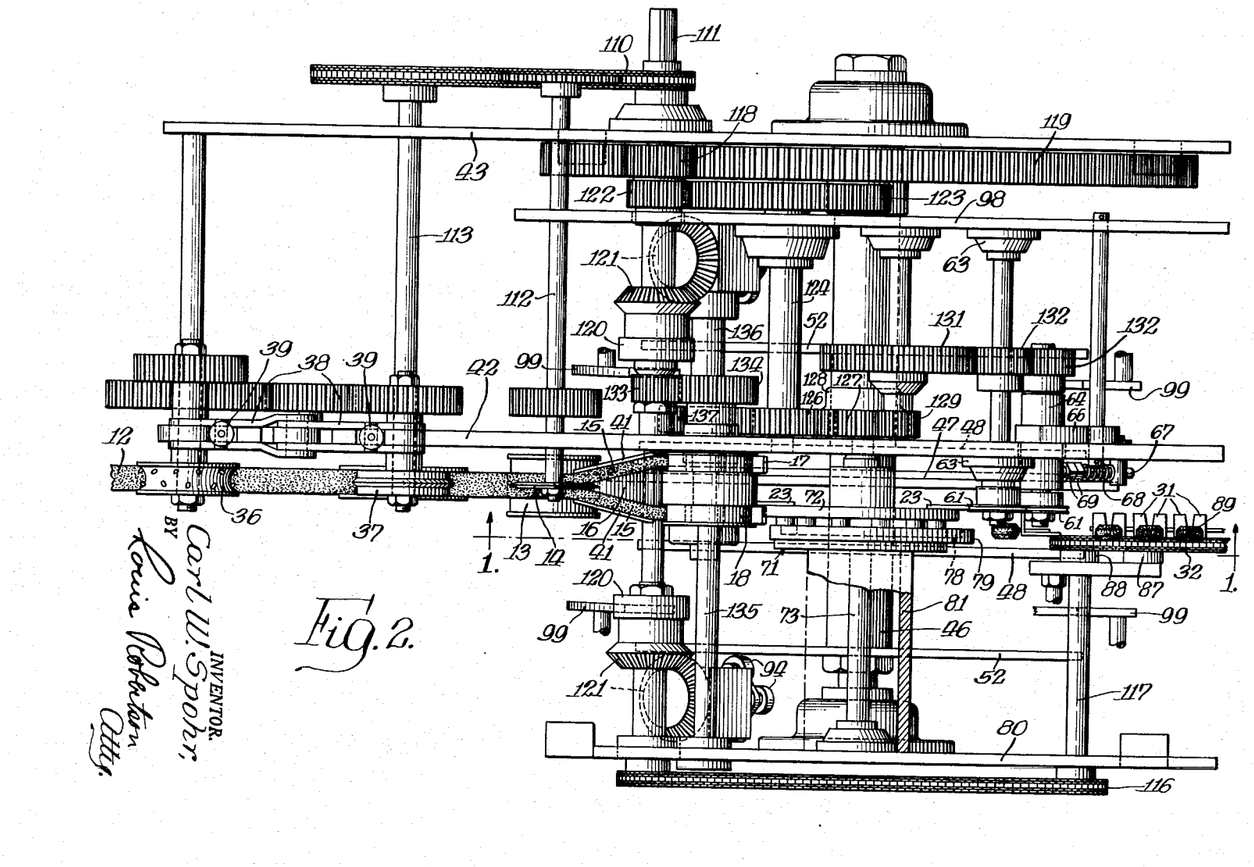
Figure 2 is a view looking down on the apparatus chosen for illustration of this invention, some parts being omitted or broken away for the sake of clarity.

In the form of the machine chosen for illustration, and with special reference to Fig. 1, cord 11 is fed to the machine from a roll, not shown, and a more or less continuous candy strip 12 is fed from a pre-forming device to cutting wheels 13 and 14, which cut it into two smaller strips 15 which are spread apart by wedge 16 (as best illustrated in Fig. 2).

The candy strip 15 seen in Fig. 1 is pressed into a charger wheel 17 by a presser wheel 18, the strip being severed into separate pieces 19 by the same operation. In a similar manner, another charger wheel, slightly spaced away on the same shaft, is loaded with separate pieces of candy.

Figure 11:
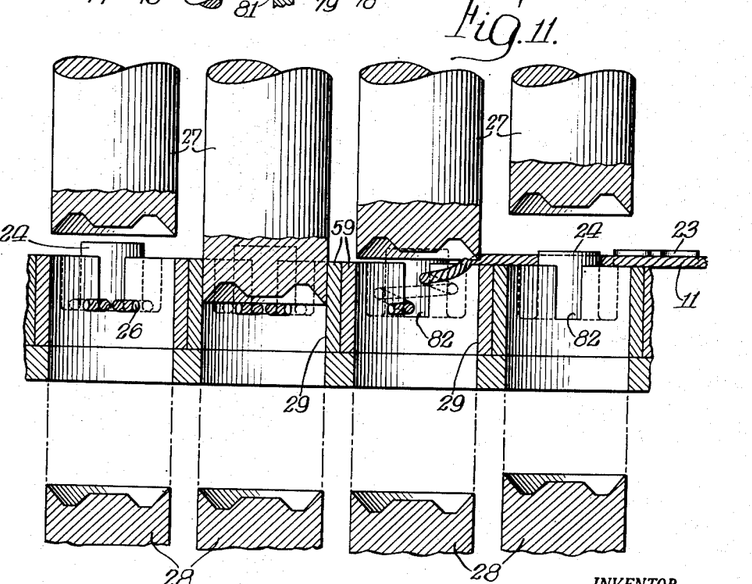
Figure 11 is a somewhat diagrammatic view illustrating four successive die plungers and the associated parts as the cord is fed (at the right), next, as it is cut off, then as it is slid along the pin, and finally as the plunger performing these functions is withdrawn to receive the candy, taken on line 11—11 of Fig. 1.

In the meantime, looped cord handles are formed and brought to the position between the two charger wheels 17. For this purpose the cord 11 is advanced by feeder wheels 61 and is thrust by blades or fingers 23 between moving pins 24 of drum 25 to form the loops. As the blade 23 reaches its deepest penetration between two adjacent pins 24, the cord is cut off by die plunger operation as will be described, to form separate looped handles 26, and pressed into position in a die block 58 to pass between the charger wheels 17, the die plunger being withdrawn to pass outside of these wheels. The cutting of the cords by plunger 27 is best illustrated in Fig. 11. The passage of the cord handles 26 between the charger wheels 17 as the plungers 27 and 28 pass outside of these wheels is best seen in Fig. 5. Approximately as the plungers reach the common axial plane passing through the inner faces of the charger wheels 17 and the drum 25 carrying the plungers, the plungers are thrust rapidly toward one another to the position shown in Fig. 4, thus stripping the candy pieces from the charger wheels 17 and pressing them against opposite sides of the cord handle 26. Further movement of the die plungers 27 and 28 squeezes the pieces within the die sleeve or die bore 29 in die block 58 to form the lollipop to the desired shape and anchor it firmly to the ends of cord handle 26.

Figures 7, 8, 9:
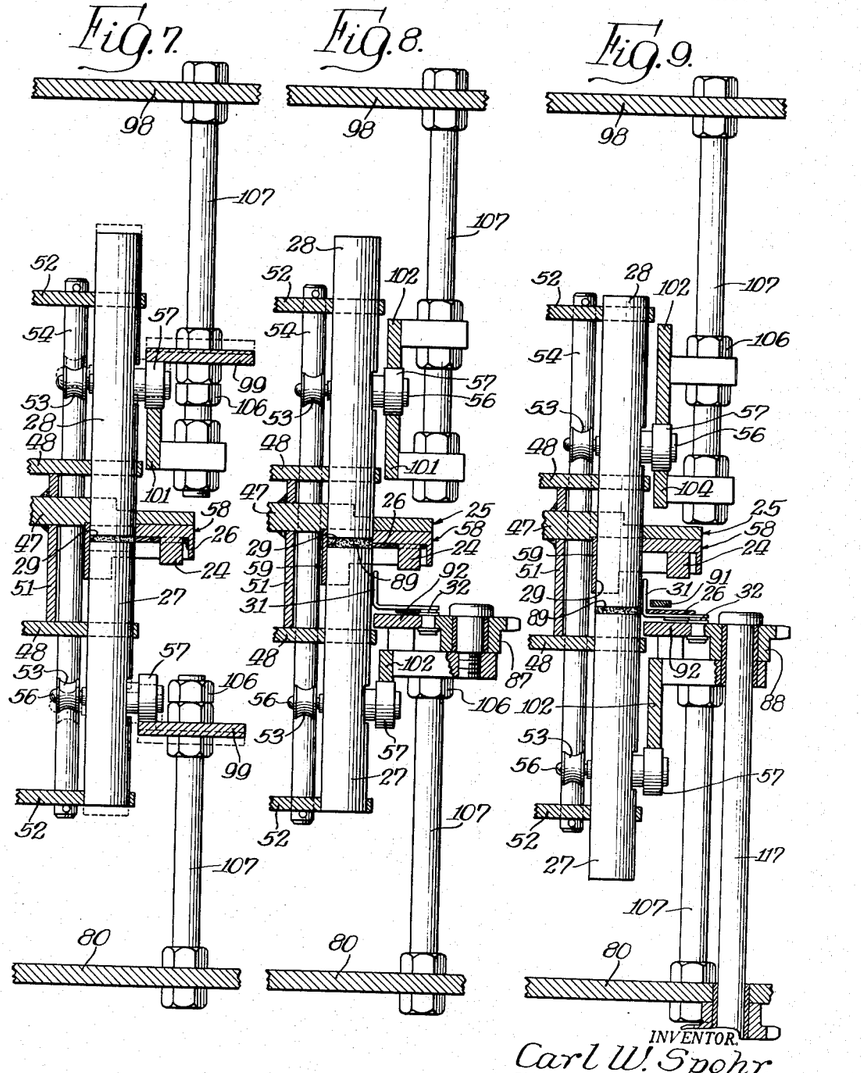
Figures 7 to 9 are similar fragmentary sectional views taken approximately on the lines 7—7, 8—8, and 9—9, respectively, of Fig. 3, showing the relative position of the die plungers, first as they carry the lollipop around the drum for initial cooling, secondly, as they approach the discharge position and one die is backed away from the lollipop and finally as they have shifted the lollipop into the forked hanger carried by the take-off chain.

The cord handle is then carried around the forming drum 25 while the lollipops cool sufficiently to be removed. Plunger 28 is then backed away slightly as seen in Fig. 8 to break it loose from the candy. It is then moved back against the candy and plungers 27 and 28 are both moved to the position shown in Fig. 9, thus moving the lollipop so that the cord passes off pin 24 and onto, or between the fingers of, a holder or hanger 31 carried by delivery chain 32. The plungers 27 and 28 are then separated to begin the cycle again while the lollipop is carried away from the machine.

Filling the charging wheel

Figure 3:
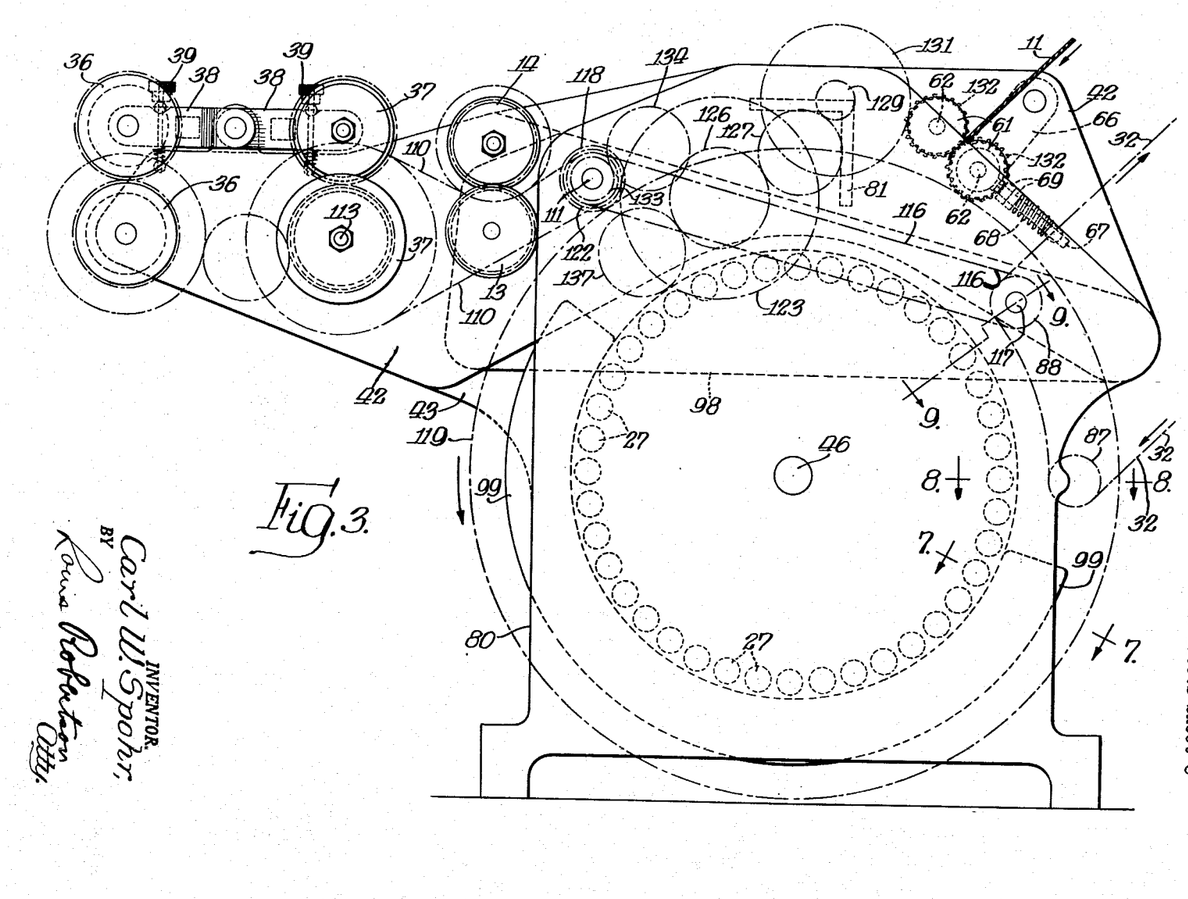
Figure 3 is a largely diagrammatic side view of the apparatus shown in Figure 2 with special attention to the drive connections.

The candy strip 12 which may be pre-formed into approximately the right diameter either by hand or by preforming rolls, is sized and fed forwardly by feed rolls 36 (Fig. 2). Next it is grooved by a pair of grooving rolls 37. As best seen in Figs. 2 and 3, the upper rolls 36 and 37 are adjustably positioned with respect to the lower rolls. Thus they may be mounted on pivoted arms 38 limited in upward movement by hand screws 39 against which they are pressed by suitable springs.

Slitting wheels 13 and 14 may be adjustably spaced. In any event, the rotary knife or slitting wheel 14 runs approximately in contact with the anvil roll 13 to slit the candy into two strips. These strips are forced apart by wedge 16 which may also sever any residual connecting web or threads. Guide plates 41 direct the two strips 15 between the flanges of presser rolls 18 which by cooperation with the notched charger rolls 17 sever the strips 15 into separate pieces which are pressed into the notches of the charger rolls 17.

Forming drum 25

Figure 4:
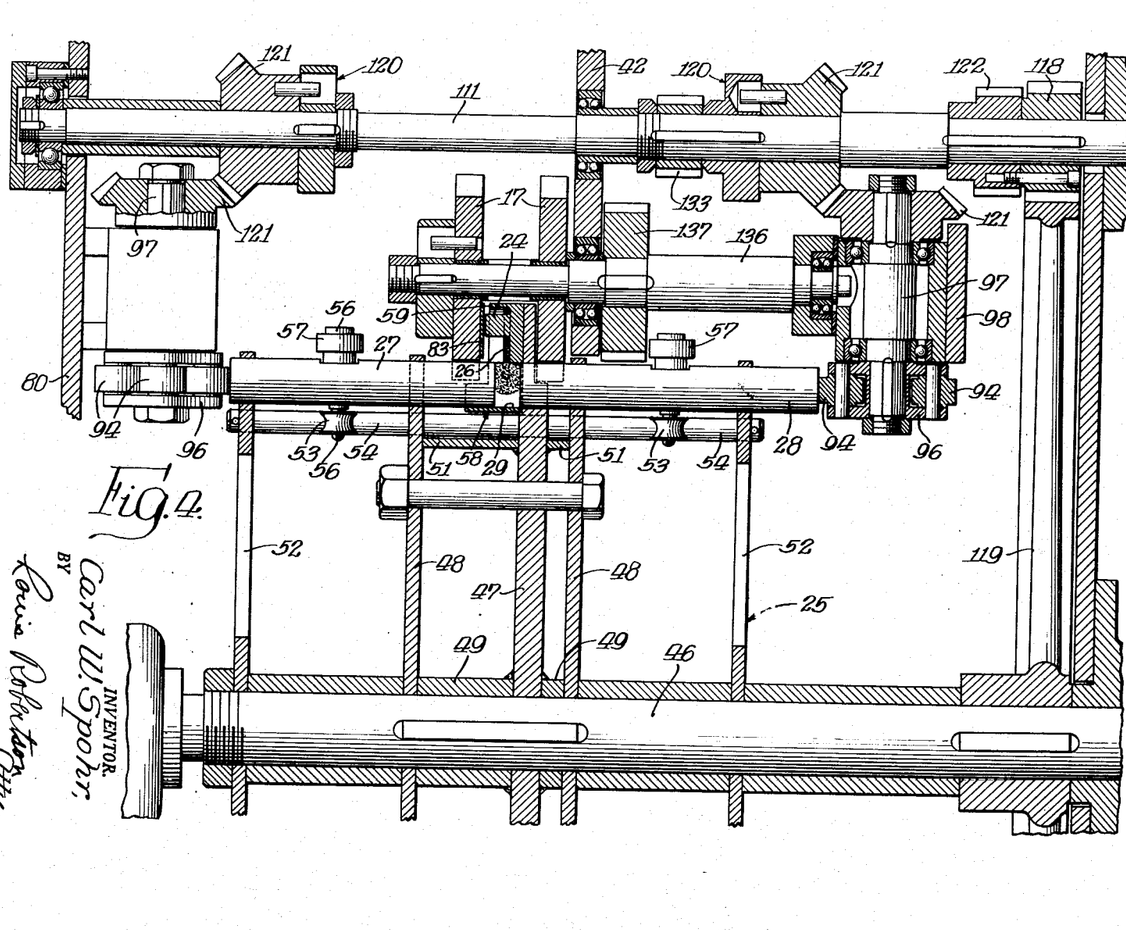
Figure 4 is a fragmentary sectional view taken approximately on the line 4—4 of Figure 1, showing particularly the cooperation of the die plungers and charging wheels.
Figure 5:
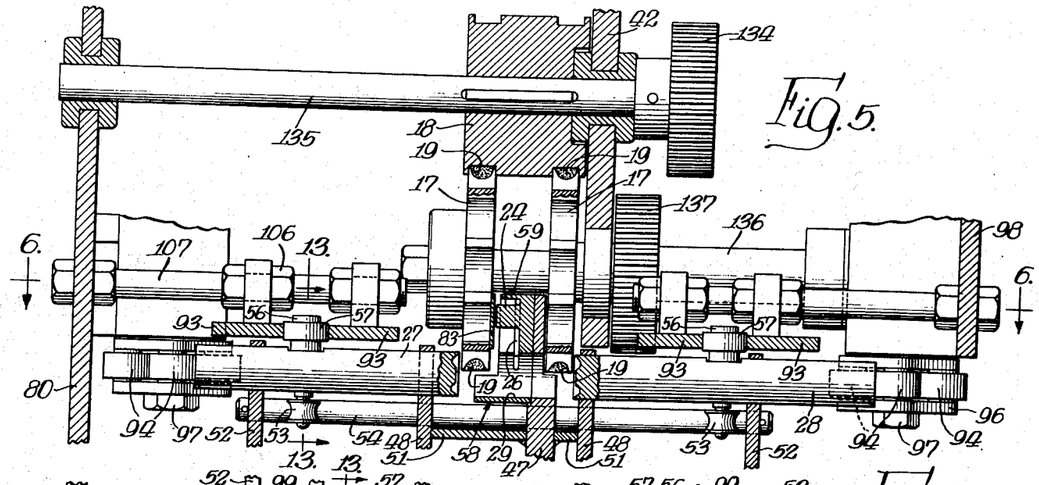
Figure 5 is a fragmentary sectional view taken approximately on the irregular line 5—5 of Figure 1, showing co-action of the charger wheels and the presser roller engaging them and showing the die plungers as they are about to be thrust toward one another, some parts being broken away for the sake of clarity.
Figure 13:
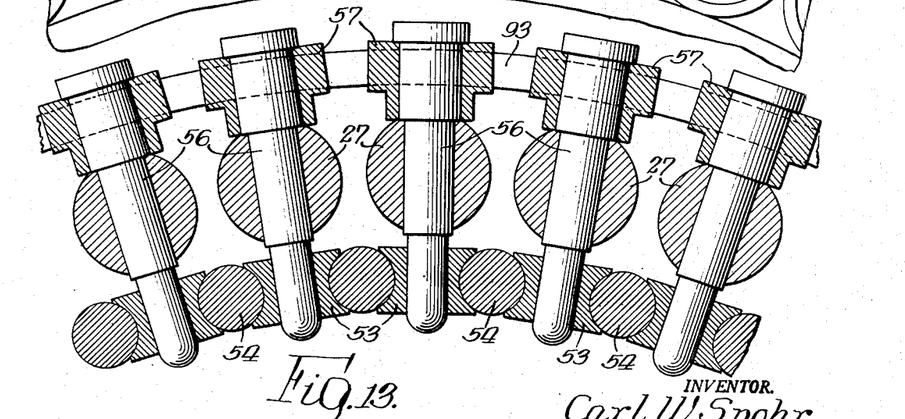

The forming drum 25 is carried by a shaft 46 to which it is keyed and is made up as best seen in Fig. 4. There it is seen to include a central plate 47 and two other main plates 48, all keyed to shaft 46 and rigidly bolted together, being correctly spaced by sleeves 49 and 51 welded to plate 47. Die plungers 27 and 28 are guided by plates 48 and also by outer plates 52, also carried on shaft 46. The plungers 27 and 28 are maintained in a given angular position in respect to the drum by guide rollers 53 which run on guide rods 54, which pass snugly through plates 48, plate 47 and plates 52. The rods 54 also ensure proper alignment of plates 48. As seen best in Fig. 13, rollers 53 are carried by pins 56, each of which extends through a die plunger 27 or 28. A cam follower roller 57 is carried on the upper end of each pin 56.

As seen best in Figs. 1 and 5, the plate 47 carries along the peripheral portion of one face a series of die blocks 58, each of which includes the pin 24 and the die sleeve 29 previously mentioned. A flange 59 forming part of block 58 extends from the sleeve 29 around the pin 24, being spaced from the pin 24 to receive the cord handle 26. The sleeve 29 is notched to receive one of the charging wheels 17 and also to permit entrance of the end of the cord into the ends of the sleeve. The plate 47 includes a bore aligned with sleeve 29 so that the plate may be deemed a part of the die sleeve or die bore. It is likewise notched to receive the other charging wheel 17. Because the die bore 29, including the portion thereof formed by plate 47, extends under each charging wheel 17, it is apparent that when the plungers 27 and 28 press the pieces of candy out of the charging wheel, there is no danger that they will drop out of the die sleeve 29.

It will be understood that the plungers 27 and 28 have a smooth sliding fit with the die bore 29 so as to be able to mould the candy firmly within the die bore 29.

Cord feeder

Figure 10:
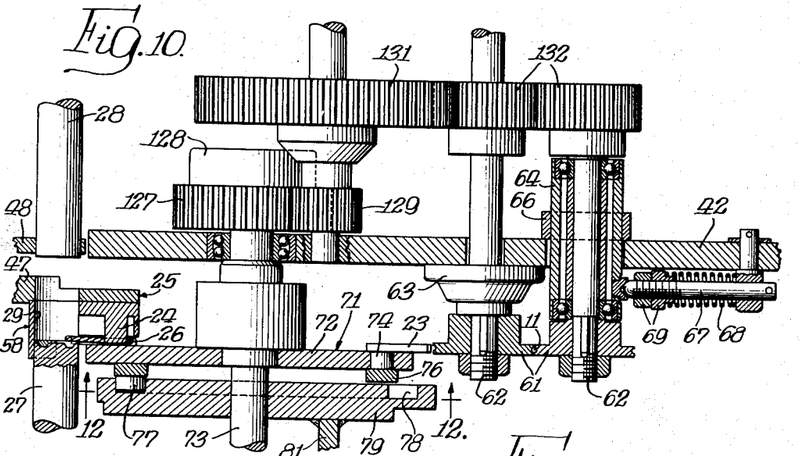
Figure 10 is a sectional view taken approximately on the irregular line 10—10 of Figure 1 to show details of the looper mechanism and cord feeder.

The details of the cord feeder are best seen in Figs. 1, 2 and 10. The cord passes through the bite formed by two grooved feeding wheels 61 which are driven by shafts 62. One of the shafts is carried by fixed bearings 63 and the other is carried by spaced bearings on a shiftable sleeve 64 which is carried by a pivoted arm 66 pivoted to the main frame member 42. The wheels 61 are urged toward one another by a pin 67 under influence of spring 68, the tension of which may be adjusted by nuts 69.

Looper

Figure 12:
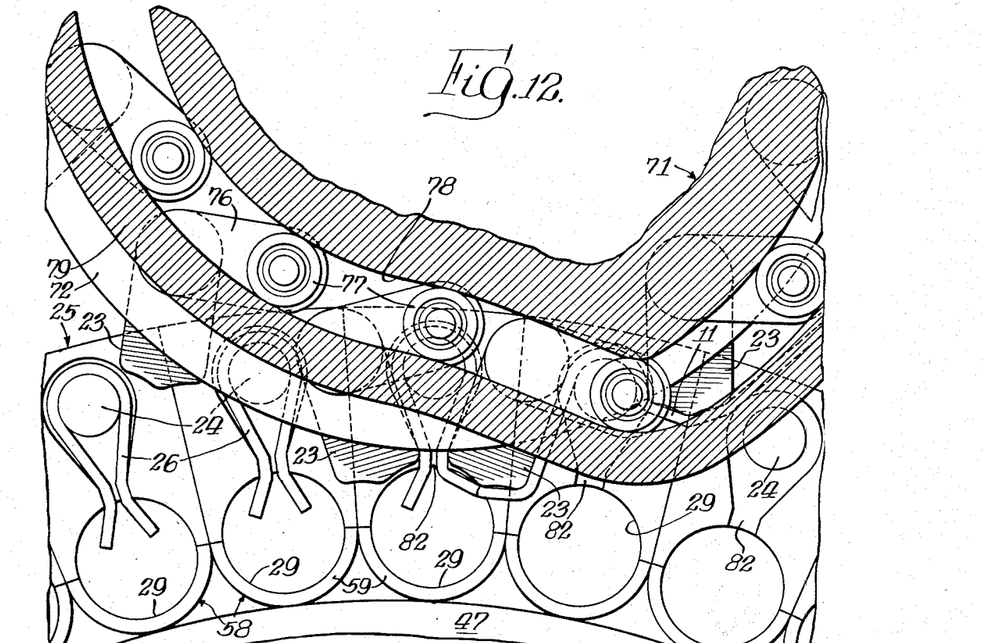
Figure 12 is a vertical sectional view taken approximately along the line 12—12 of Fig. 10, to show details of the looper construction and operation.

Although the general construction of the looper 71 is apparent from Fig. 1, its details are more clearly seen in Figs. 10 and 12. The looper 71 includes a wheel 72 driven by shaft 73 and carrying the blades 23 pivotally mounted on the wheel 72. Specifically, each blade 23 is carried by trunnion 74 journaled in wheel 72; the other end of trunnion 74 carries a crank arm 76 on which a cam follower roller 77 is mounted. The cam follower roller 77 rides in a cam groove 78 of cam plate 79, which is stationarily carried by the frame. It may be centered by shaft 73 and secured rigidly by angular bracket 81 (seen in cross section in Fig. 1), which extends from side frame member 80 as seen in Fig. 2.

As seen best in Fig. 12, the cam groove 78 is shaped so as to keep the ends of blade 23 aligned to enter between two pins 24, thus thrusting the cord deeply between these two adjacent pins. As each die bore 29 approaches the cut-off position at the center of Fig. 12, the two blades 23 adjacent to it press the cord from both sides toward the center line of the die so that the two end portions of the cord are aligned with notch 82. Thus, when a plunger 27 moves into the die bore 29, as seen in Fig. 11, it can press the cord into and along the notch or slot 82 to the base thereof.

As the die plunger 27 enters the die bore 29, it shears the cord as seen in Fig. 11. The cut ends of the cord spring back somewhat so that both ends lie in a suitable position to be surrounded by the candy of the lollipop.

Figure 6:
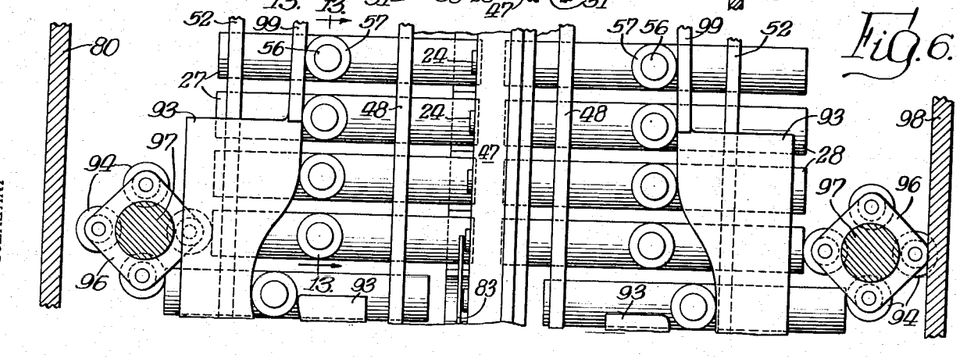
Figure 6 is a fragmentary sectional view taken approximately on the line 6—6 of Figure 5 and showing particularly the means for thrusting the die plungers toward one another.

Although the slight resiliency of the cord tends to hold it in place within the notch 82, a stationary guard plate 83 may be provided if desired, as seen in Figs. 4, 5 and 6. A small broken-away portion of this guard plate 83 has been shown in Fig. 1 and it should be understood that it extends from looper wheel 72 and partially overlaps inside of charger wheel 17 and is supported by the frame. If desired, it may cam the upper portion of the cord to the desired position at the base of the pin 24, in which event a slot could be provided to receive the camming portion of guard plate 83.

Delivery of finished lollipops

The lollipops are carried away from the machine by a chain 32 which, as seen best in Figs. 1 and 3, comes into cooperation with drum 25 as it passes around sprocket 87. It moves with the drum while the lollipops are transferred to it and then passes away around sprocket 88. Forked holders 31 are carried by the chain at properly spaced points for receiving the lollipops in succession. As seen best in Figs. 2 and 14–L, the holders 31 are in the form of diverging fingers. The candy 89 of the lollipop may rest against the holders 31 while the handle 26 extends through between the fingers thereof.

The transfer of the lollipops to the delivery chain is best seen in Figs. 7, 8 and 9. Before the lollipop reaches the position of the delivery chain, it is held as seen in Fig. 7 with die plungers 27 and 28 gripping the candy within the die bore 29, the handle 26 being at the base of pin 24. As the transfer position is approached, die plunger 28 is backed away from the candy 89, as seen in Fig. 8, to break it loose from the candy 89 while the candy is restrained by its handle 26 from following die plunger 28. It should be understood that by this time the candy will have cooled sufficiently so that when the die plunger is pressed back against the candy there will be little or no adhesion.

The plunger 28 is now moved back against the candy and the plungers 28 and 27 are together moved to carry the candy from the pin 24 to the holder 31, the completion of this movement being shown in Fig. 9. Just after the movement is completed, the handle 26 passes under a retaining bar 91 so that the candy will be safely held in the holder 31 while both plungers 28 and 27 are moved away from it so that the chain 32 can withdraw the candy from the machine. As the chain 32 moves along with the drum 25, it may be supported in its arcuate movement by a runner 92, seen best in Figs. 1, 8 and 9. This runner may be carried by the frame.

Control of die plungers

Figure 14R:
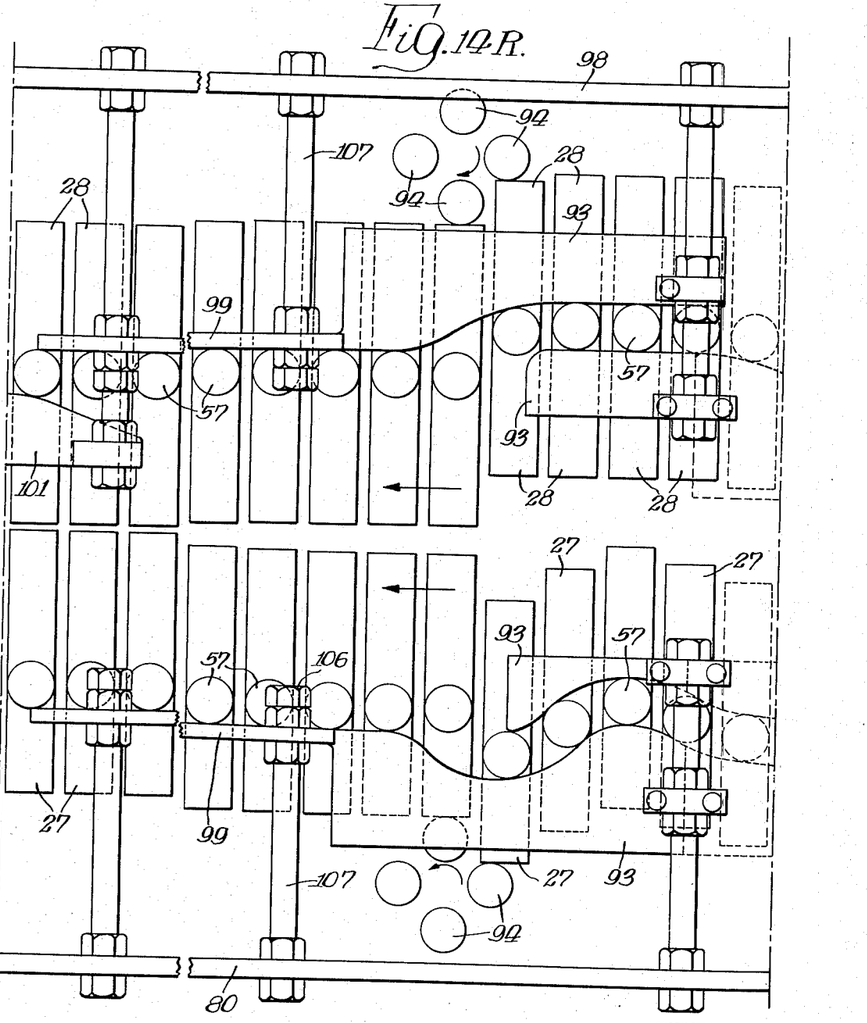

As previously indicated, the die plungers 27 and 28 are provided with cam follower rollers 57. These rollers 57 cooperate with various cams as seen in 14–L and 14–R. Thus, as seen at the right of Figure 14–R, plunger 27 is moved forwardly (toward its companion plunger 28). This particular movement is the movement for cutting the cord and pressing the cord into notch 82 to the proper position for receiving the candy. The plunger 27 is then backed away to receive the candy, the plunger 28 being held in its outermost or retracted position throughout this period. The movements so far described in this paragraph are accomplished by cams 93, which may be plates cut to the shape shown and secured by the frame member. As the candy is received from the charger, the plungers 27 and 28 may be rapidly shoved together by the cams, but to secure rapid inward movement without excessive friction or wear, it is preferred that they be thrust in by the thrust rollers 94, diagrammatically indicated in Fig. 14-R and shown more completely in Figs. 4 and 6. Thus the rollers 94 may be carried by wheels 96 keyed to shaft 97, rotating in spaced bearings carried by the frame member 98. The wheels 96 are driven in timed relationship to thrust the plungers 27 and 28 toward one another as the plungers are moved forwardly by drum 25. Thus in approximately the spacing of adjacent pairs of plungers, substantially the full stroke of the plungers is accomplished, as seen in Fig. 14-R. This strips the candy from the charging wheel 17 and presses it somewhat lightly into contact with the cord handle.

Shortly thereafter, the cam follower rollers 57 move into contact with adjustable cam plates 99. The initial part of these plates converge to squeeze the candy to predetermined dimensions. The dimensions will depend upon the amount of candy in each lollipop which may be varied by the spacing of the feeding wheels 36 and 37. The candy is maintained in the squeezed condition through a substantial part of the revolution around drum 25. However, as the discharge position is approached, the cam followers 57 on plungers 28 will pass out from under cams 99 and will strike cam plate 101. This cam 101 backs the plungers 28 away from the candy to break them loose from the lollipops. Cam rollers 57 next engage cams 102, which restore plungers 28 to the candy and then move both plungers together to move the candy to holders 31. The plungers are then separated by one of the cams 102 and by cam 104 to permit the candy to be removed from between the plungers. Cam 104 then retracts plungers 28 and cams 93 move plungers 27 inwardly to start the next cycle of operation.

Preferably all of the cams are adjustably positioned by nuts 106 on rods 107, rigidly carried by frame members 80 and 98. If desired, the candy-squeezing cams 99, or one of them, may be yieldably mounted to press the plungers firmly but resiliently against the candy.

Operation

The general operation will be sufficiently apparent from the heading "General Description." The detailed operation of the various parts will be sufficiently apparent from the descriptions applicable to those parts.

Drive

Although the exact details of the drive may of course be varied quite extensively, the drive now contemplated may be traced in Figs. 2 and 3. A shaft 111 may be deemed the main drive shaft and may be connected by a pulley or sprocket (not shown) to a suitable source of power. Through chains and sprockets, the shaft 111 drives shaft 112 carrying knife 14 and shaft 113 carrying one of the groove rolls 37. The roll 13 is geared to shaft 112 and the other grooving roll 37 and feed rolls 36 are geared to shaft 113. The chain 116 connects drive shaft 111 to drive shaft 117 for the discharge conveyor chain 32.

Gear 118 on shaft 111 drives gear 119 which, as seen best in Fig. 4, drives the drum 25. Beveled gears 121 on shaft 111 drive shafts 97 for rotating the roller cluster wheels 96. As indicated in Fig. 4, the beveled gears 121 may be connected to shaft 111 through timing adjustment devices 120. These are merely devices by which the angularity between the shaft 111 and the gears 121 may be adjusted. Pinion 122 on shaft 111 drives gear 123 on shaft 124, which carries gear 126. Gear 126 drives gear 127 which, through a timing adjuster 128, drives shaft 73 and looper 72. Gear 127 in turn drives gear 129 which, through gear 131, drives cord feeder gears 132.

A pinion 133 keyed to main gear shaft 111 drives gear 134 on shaft 135, which drives presser wheel 18. The charger wheels 17 cooperating with presser wheel 18 are carried by shaft 136 which may be driven by gear 137 driven by gear 126.

From the foregoing, it is seen that a lollipop machine has been devised which, though relatively simple compared to prior dependable machines, will loop cord to form a handle, cut the cord, mould the lollipop around the ends of the looped handle, partially cool the lollipop and convey it to a discharge conveyor. Furthermore, lollipops may be formed of relatively small amounts of candy because separate pieces of candy are supplied on opposite sides of the handle to be moulded around the handle. With prior machines, it proved difficult to embed the cord handle dependably when small amounts of candy were used. Most simply, the two pieces may be derived from a single initial strand of candy stock. Initially, separate strands may be used, however, or if two different flavors are desired for the two faces (halves) of the lollipop.

Of course the candy stock used is in a hot plastic form which congeals on cooling.

I claim:

1. Apparatus for making lollipops and transferring them to a delivery conveyor, including a drum having a series of pins thereon generally parallel to the axis of the drum, means for feeding cord toward said pins, a looper wheel, a series of blades pivotally carried by the wheel, means for controlling the blades to tuck the cord between successive pins on the drum and to press the cord portions on opposite sides of one pin toward one another, a series of die members having bores therethrough carried by the drum in association with the pins and positioned to receive the cord portions thus pressed together, pairs of die plungers carried by the drum in alignment with successive die members on opposite sides thereof, means for moving plungers on one side into the die members, as the cord portions are pressed toward one another to sever a length of cord forming one handle from the remaining cord and to press the severed cord length into the die member, means positioned at a subsequent station along the drum for aligning two pieces of candy with the die member on opposite sides thereof, means for moving the paired plungers into the successive die members to press the candy pieces together around the handle, means at a remote position along the drum for backing away one of the plungers from the candy while the candy is restrained from following it, means for reengaging said plunger with the candy and moving both plungers to transfer the candy to the delivery conveyor and for separating the plungers to release the candy to be carried away by the conveyor.

2. Apparatus for making lollipops, including a drum having a series of pins thereon extending generally parallel to the axis of the drum, a die block associated with each pin having a die bore therethrough, and having an open-sided slot communicating with the bore for receiving cord looped around the pin, a pair of plungers aligned with each bore on opposite sides of the die block and carried by the drum for movement with the drum and movable axially of the drum, guide means for restraining the plungers from angular movement with respect to the die blocks, means for wrapping cord around the successive pins and holding portions of the cord on opposite sides of the pin in alignment with the slot, means for advancing a plunger to cut the section of the cord thus held from the remainder of the cord, thus forming one handle, and to press it into said slot and for retracting the plunger, charging means for positioning a pair of pieces of candy on opposite sides of the successive bores, means for advancing both plungers of each pair to move the candy from the charging means to the bores and for pressing the candy pieces together around the handle and means for retracting the plungers after a cooling period to release the candy, said apparatus including means for shifting the handles from the pins.

3. Apparatus for making lollipops, including a drum having a series of pins thereon extending generally parallel to the axis of the drum, a die block associated with each pin having a die bore therethrough, and having an open-sided slot communicating with the bore for receiving cord looped around the pin, a pair of plungers aligned with each bore on opposite sides of the die block and carried by the drum for movement with the drum and for movement along the drum axially of the plungers, means for wrapping cord around the successive pins and holding portions of the cord on opposite sides of the pin in alignment with the slot, means for advancing a plunger to cut the section of the cord thus held from the remainder of the cord, thus forming one handle, and to press it into said slot and for retracting the plunger, charging means for positioning candy on opposite sides of the successive bores, means for advancing both plungers of each pair to move the candy from the charging means to the bores and for pressing the candy together around the handle, and means for retracting the plungers after a cooling period to release the candy, said apparatus including means for shifting the handles from the pins.

4. Apparatus for making lollipops, including a drum having a series of pins thereon extending generally parallel to the axis of the drum, a die block associated with each pin having a die bore therethrough, and having an open-sided slot communicating with the bore for receiving cord looped around the pin, a pair of plungers aligned with each bore on opposite sides of the die block and carried by the drum for movement with the drum and for movement along the drum axially of the plungers, means for wrapping cord around the successive pins and holding portions of the cord on opposite sides of the pin in alignment with the slot, means for advancing a plunger to cut the section of the cord thus held from the remainder of the cord, thus forming one handle, and to press it into said slot and for retracting the plunger, charging means for positioning candy on opposite sides of the successive bores, means for advancing both plungers of each pair to move the candy from the charging means to the bores and for pressing the candy together around the handle, and means for retracting the plungers after a cooling period to release the candy.

5. Apparatus for making lollipops, including a drum having a series of pins thereon extending generally parallel to the axis of the drum, a die block associated with each pin having a die bore therethrough, and having an open-sided slot communicating with the bore for receiving cord looped around the pin, a pair of plungers aligned with each bore on opposite sides of the die block and carried by the drum for movement with the drum and for movement along the drum axially of the plungers, guide means for restraining the plungers from angular movement with respect to the die blocks, means for wrapping cord around the successive pins and holding portions of the cord on opposite sides of the pin in alignment with the slot, means for advancing a plunger to cut the section of the cord thus held from the remainder of the cord, thus forming one handle, and to press it into said slot and for retracting the plunger, charging means for positioning a pair of pieces of candy on opposite sides of the successive bores, means for advancing both plungers of each pair to move the candy from the charging means to the bores and for pressing the candy pieces together around the handle and means for retracting at least one plunger to release the candy, said apparatus including means for shifting the handles from the pins.

6. Apparatus for making lollipops, including a drum having a series of pins thereon extending generally parallel to the axis of the drum, a die block associated with each pin having a die bore therethrough, and having an open-sided slot communicating with the bore for receiving cord looped around the pin, a pair of plungers aligned with each bore on opposite sides of the die block and carried by the drum for movement with the drum and for movement along the drum axially of the plungers, means for wrapping cord around the successive pins and holding portions of the cord on opposite sides of the pin in alignment with the slot, means for advancing a plunger to cut the section of the cord thus held from the remainder of the cord, thus forming one handle, and to press it into said slot and for retracting the plunger, charging means for positioning candy on opposite sides of the successive bores, means for advancing both plungers of each pair to move the candy from the charging means to the bores and for pressing the candy together around the handle, and means for retracting at least one plunger to release the candy.

7. Apparatus for making lollipops, including a drum having a series of pins thereon extending generally parallel to the axis of the drum, a die block associated with each pin having a die bore therein, and having an open-sided slot communicating with the bore for receiving cord looped around the pin, a plunger aligned with each bore and carried by the drum for movement with the drum and for movement along the drum axially of the plungers, means for wrapping cord around the successive pins and holding portions of the cord on opposite sides of the pin in alignment with the slot, means for advancing a plunger to cut the section of the cord thus held from the remainder of the cord, thus forming one handle, and to press it into said slot and for retracting the plunger, charging means for positioning candy on opposite sides of the handle, and means for advancing the plunger to press the candy around the handle.

8. Apparatus for making lollipops, including a drum having a series of pins thereon extending generally parallel to the axis of the drum, a die block associated with each pin having a die bore therein, and having an open-sided slot communicating with the bore for receiving cord looped around the pin, a plunger aligned with each bore and carried by the drum for movement with the drum and for movement along the drum axially of the plungers, means for wrapping cord around the successive pins and holding portions of the cord on opposite sides of the pin in alignment with the slot, means for advancing a plunger to cut the section of the cord thus held from the remainder of the cord, thus forming one handle, and to press it into said slot and for retracting the plunger, charging means for positioning candy between the plunger and the handle, and means for advancing the plunger to press the candy around the handle.

9. Apparatus for making lollipops, including a carrier having a series of pins thereon extending generally transverse to carrier movement, a die block associated with each pin having a die bore therethrough, and having an open-sided slot communicating with the bore for receiving cord looped around the pin, a pair of plungers aligned with each bore on opposite sides of the die block and carried by the carrier for movement with the carrier and for movement along the carrier axially of the plungers, guide means for restraining the plungers from angular movement with respect to the die blocks, means for wrapping cord around the successive pins and holding portions of the cord on opposite sides of the pin in alignment with the slot, means for advancing a plunger to cut the section of the cord thus held from the remainder of the cord, thus forming one handle, and to press it into said slot and for retracting the plunger, charging means for positioning a pair of pieces of candy on opposite sides of the successive bores, means for advancing both plungers of each pair to move the candy from the charging means to the bores and for pressing the candy pieces together around the handle and means for retracting the plungers after a cooling period to release the candy, said apparatus including means for shifting the handles from the pins.

10. Apparatus for making lollipops, including a carrier having a series of pins thereon extending generally transverse to carrier movement, a die block associated with each pin having a die bore therethrough, and having an open-sided slot communicating with the bore for receiving cord looped around the pin, a pair of plungers aligned with each bore on opposite sides of the die block and carried by the carrier for movement with the carrier and for movement along the carrier axially of the plungers, means for wrapping cord around the successive pins and holding portions of the cord on opposite sides of the pin in alignment with the slot, means for advancing a plunger to cut the section of the cord thus held from the remainder of the cord, thus forming one handle, and to press it into said slot and for retracting the plunger, charging means for positioning candy on opposite sides of the successive bores, means for advancing both plungers of each pair to move the candy from the charging means to the bores and for pressing the candy together around the handle, and means for retracting the plungers after a cooling period to release the candy, said apparatus including means for shifting the handles from the pins.

11. Apparatus for making lollipops, including a carrier having a series of pins thereon extending generally transverse to carrier movement, a die block associated with each pin having a die bore therethrough, and having an open-sided slot communicating with the bore for receiving cord looped around the pin, a pair of plungers aligned with each bore on opposite sides of the die block and carried by the carrier for movement with the carrier and for movement along the carrier axially of the plungers, means for wrapping cord around the successive pins and holding portions of the cord on opposite sides of the pin in alignment with the slot, means for advancing a plunger to cut the section of the cord thus held from the remainder of the cord, thus forming one handle, and to press it into said slot and for retracting the plunger, charging means for positioning candy on opposite sides of the successive bores, means for advancing both plungers of each pair to move the candy from the charging means to the bores and for pressing the candy together around the handle, and means for retracting the plungers after a cooling period to release the candy.

12. Apparatus for making lollipops, including a carrier having a series of pins thereon extending generally transverse to carrier movement, a die block associated with each pin having a die bore therethrough, and having an open-sided slot communicating with the bore for receiving cord looped around the pin, a pair of plungers aligned with each bore on opposite sides of the die block and carried by the carrier for movement with the carrier and for movement along the carrier axially of the plungers, guide means for restraining the plungers from angular movement with respect to the die blocks, means for wrapping cord around the successive pins and holding portions of the cord on opposite sides of the pin in alignment with the slot, means for advancing a plunger to cut the section of the cord thus held from the remainder of the cord, thus forming one handle, and to press it into said slot and for retracting the plunger, charging means for positioning a pair of pieces of candy on opposite sides of the successive bores, means for advancing both plungers of each pair to move the candy from the charging means to the bores and for pressing the candy pieces together around the handle and means for retracting at least one plunger to release the candy, said apparatus including means for shifting the handles from the pins.

13. Apparatus for making lollipops, including a carrier having a series of pins thereon extending generally transverse to carrier movement, a die block associated with each pin having a die bore therethrough, and having an open-sided slot communicating with the bore for receiving cord looped around the pin, a pair of plungers aligned with each bore on opposite sides of the die block and carried by the carrier for movement with the carrier and for movement along the carrier axially of the plungers, means for wrapping cord around the successive pins and holding portions of the cord on opposite sides of the pin in alignment with the slot, means for advancing a plunger to cut the section of the cord thus held from the remainder of the cord, thus forming one handle, and to press it into said slot and for retracting the plunger, charging means for positioning candy on opposite sides of the successive bores, means for advancing both plungers of each pair to move the candy from the charging means to the bores and for pressing the candy together around the handle, and means for retracting at least one plunger to release the candy.

14. Apparatus for making lollipops, including a carrier having a series of pins thereon extending generally transverse to carrier movement, a die block associated with each pin having a die bore therein, and having an open-sided slot communicating with the bore for receiving cord looped around the pin, a plunger aligned with each bore and carried by the carrier for movement with the carrier and for movement along the carrier axially of the plungers, means for wrapping cord around the successive pins and holding portions of the cord on opposite sides of the pin in alignment with the slot, means for advancing a plunger to cut the section of the cord thus held from the remainder of the cord, thus forming one handle, and to press it into said slot and for retracting the plunger, charging means for positioning candy on opposite sides of the handle, and means for advancing the plunger to press the candy around the handle.

15. Apparatus for making lollipops, including a carrier having a series of pins thereon extending generally transverse to carrier movement, a die block associated with each pin having a die bore therein, and having an open-sided slot communicating with the bore for receiving cord looped around the pin, a plunger aligned with each bore and carried by the carrier for movement with the carrier and for movement along the carrier axially of the plungers, means for wrapping cord around the successive pins and holding portions of the cord on opposite sides of the pin in alignment with the slot, means for advancing a plunger to cut the section of the cord thus held from the remainder of the cord, thus forming one handle, and to press it into said slot and for retracting the plunger, charging means for positioning candy between the plunger and the handle, and means for advancing the plunger to press the candy around the handle.

16. Apparatus for forming looped handles in position for the application of candy thereto to make lollipops, including means for feeding a cord, a drum having thereon a series of pins extending generally parallel to the axis of the drum, a wheel near the periphery of said drum and having thereon a series of fingers for tucking a section of the cord between said pins, said fingers being pivotally carried by the wheel, and means for pivoting each of said fingers in succession to align it with a gap between the pins as it approaches the pins, to swing forwardly to press the tucked section of the cord forwardly to a cutting position for cutting a looped handle and thereafter to swing rearwardly to press rearwardly the leading end of the next handle to the rear of the cut to lie adjacent to the other strand of cord around the same pin as the latter reaches the cutting position so that the two strands may be retained in adjacency for receiving the candy.

17. Lollipop-making apparatus including a carrier, a die member carried by the carrier, having a series of passages therethrough and having slots extending into said passages at one side thereof and extending axially of their respective passages toward the adjacent face of said carrier, a pin associated with each slot and extending from its base parallel to the passage, successive pairs of plungers carried by the carrier and each aligned with a passage, means for providing looped-cord handles over the successive pins and extending into said passages to be pressed against the bases of said slots by the plungers on one side of said carrier, means for supplying candy to be pressed by the plungers around said handles in said passages, means for moving the plungers into the passages to press said candy around the handles and for retracting the plungers on the other side to break them away from the formed lollipops while they are restrained by the handles resting against the bases of the slots, a discharge conveyor having a series of hangers thereon extending from the conveyor toward the drum in a direction opposite to said pins, means to move the plungers on the second side of said carrier back against the formed lollipops and further in the same direction to shift the lollipops to the hangers and means for retracting the plungers on the first side of said carrier to permit said movement of the lollipops and further in the same direction to break them loose from said lollipops while the lollipops are restrained by the hangers.

18. Lollipop-making apparatus including a carrier, a die member carried by the carrier, having a series of passages therethrough and having slots extending into said passages at one side thereof and extending axially of their respective passages toward the adjacent face of said carrier, a pin associated with each slot and extending from its base parallel to the passage, successive pairs of plungers carried by the carrier and each aligned with a passage, means for providing looped-cord handles over the successive pins and extending into said passages to be pressed against the bases of said slots by the plungers on one side of said carrier, means for supplying candy to be pressed by the plungers around said handles in said passages, means for moving the plungers into the passages to press said candy around the handles and for retracting the plungers on the other side to break them away from the formed lollipops while they are restrained by the handles resting against the bases of the slots, a discharge conveyor having a series of hangers thereon extending from the conveyor toward the drum in a direction opposite to said pins, means to move the plungers on the second side of said carrier back against the formed lollipops and further in the same direction to shift the lollipops to the hangers and means for retracting the plungers on the first side of said carrier to permit said movement of the lollipops and further in the same direction to break them loose from said lollipops while the lollipops are restrained by the hangers, said hangers being bifurcated and located to receive the lollipops with the two strands of the looped handle confined between the bifurcations adjacent the candy.

References Cited in the file of this patent

UNITED STATES PATENTS

| Number | Name | Date |
| --- | --- | --- |
| 1,108,461 | Michitsch | Aug. 25, 1914 |
| 2,166,568 | Kwhlke | July 18, 1939 |
| 2,243,375 | Ellestad | May 27, 1941 |
| 2,278,574 | Spohr et al. | Apr. 7, 1942 |
| 2,304,494 | Cahoon | Dec. 8, 1942 |
| 2,431,489 | Latini | Nov. 25, 1947 |
| 2,513,609 | Werner | July 4, 1950 |